A. & L. CHRONIK.
SHUTTER FOR CINEMATOGRAPHIC APPARATUS.
APPLICATION FILED JUNE 7, 1916.
1,223,147.
Patented Apr. 17, 1917.
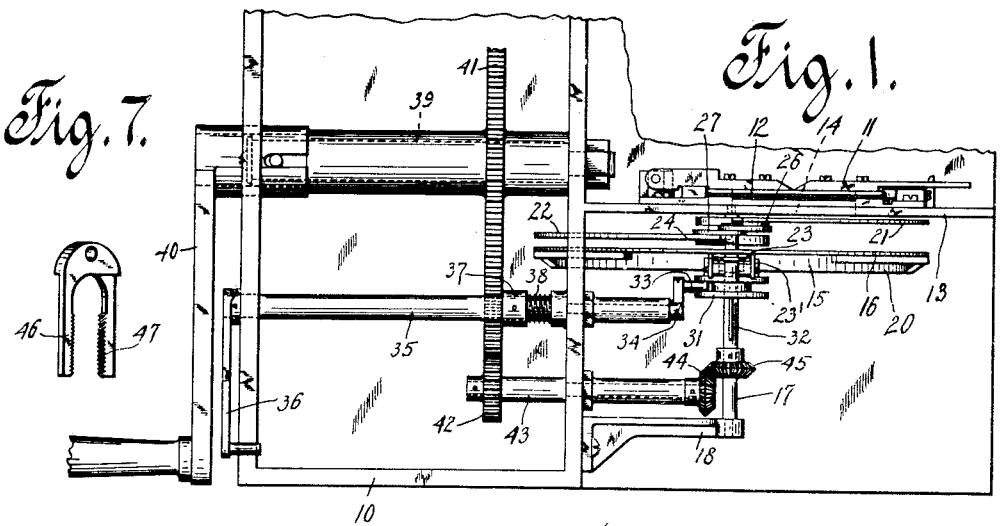

UNITED STATES PATENT OFFICE.

AUGUST CHRONIK AND LOUIS CHRONIK, OF NEW YORK, N. Y.

SHUTTER FOR CINEMATOGRAPHIC APPARATUS.

1,223,147.   Specification of Letters Patent.   Patented Apr. 17, 1917.

Application filed June 7, 1916. Serial No. 102,347.

*To all whom it may concern:*

Be it known that we, AUGUST CHRONIK and LOUIS CHRONIK, citizens of the United States, and residents of the city of New York, in the county of New York and State of New York, have invented certain new and useful Improvements in Shutters for Cinematographic Apparatus, of which the following is a specification.

The present invention relates to a shutter for cinematographic cameras. It pertains more particularly to a shutter of the disk type that is provided with a notch or opening, through which light is adapted to pass from the lens to the exposure aperture, behind which is moved the film band.

One of the objects of this invention is to provide a simple and efficient mechanism, whereby the shutter opening is adapted to be adjusted while the camera is running, or in other words while the film feeding mechanism is in operation.

Another object of the invention is to produce a shutter of the type mentioned that serves at the same time as a dissolving attachment for cameras, that is to say, as a means whereby the pictures on the film are caused to gradually fade away and other pictures are made to appear gradually in place thereof.

With these and other objects in view, which will more fully appear as the nature of the invention is better understood, the same consists in the combination, arrangement, and construction of parts hereinafter described, pointed out in the appended claims and illustrated in the accompanying drawings, it being understood that many changes may be made in the size and proportion of the several parts and details of construction within the scope of the appended claims without departing from the spirit or sacrificing any of the advantages of the invention.

Two of the many possible embodiments of the invention are illustrated in the accompanying drawings, in which:—

Figure 1 is a plan view of a portion of a cinematographic camera showing the shutter constructed in accordance with this invention mounted thereon, the cover being removed in order to more clearly show the construction; Fig. 2 is a front elevation of the said shutter; Fig. 3 is a rear elevation thereof; Fig. 4 is a section taken on line 4—4 of Fig. 2; Fig. 5 is a rear elevation of a portion of a modified shutter; Fig. 6 is a central vertical section taken therethrough; and Fig. 7 is a perspective view of a detail of the device shown in Figs. 5 and 6.

Referring now more particularly to Figs. 1 to 4, inclusive, the numeral 10 indicates the casing of a camera, in which is disposed a film feeding mechanism, that may be of any suitable type and construction, said mechanism including a gate 11, through which travels a film band 12. In front of this gate is located a partition 13, having an exposure aperture 14 in the path of the film band. With this exposure aperture is associated a shutter mechanism, indicated at 15. This mechanism comprises a disk 16, that is fixedly attached to a shaft 17, the latter being rotatably mounted in a bearing 18 and in the partition 13. The disk 16 is provided with a preferably sector-shaped opening 19, through which, in the rotation of the said disk, light is permitted to pass from the lens (not shown) through the exposure aperture. A somewhat heavy rim 20 connects the peripheral points of the edges of the opening 19 so as to balance the shutter. In parallel relation to the disk 16 there are oscillatably mounted upon the shutter shaft two leaves 21 and 22, which are adapted to be moved in parallel relation to the shutter to vary the size of the shutter opening or to close the same altogether. For actuating the leaves there is mounted upon the front face of the shutter disk 16 a slide 23, held in place by a guide 23', that permits the said slide to move in a radial direction. To this slide is fixedly attached a lug 24, which extends through a radial slot 25 in the shutter disk, and is pivoted to two links 26 and 27, which are fulcrumed at 28 and 29 to the leaves 21 and 22, respectively.

To the slide 23 is pivoted in front of the shutter disk a link 30, which is pivoted also to a grooved collar 31, the latter being shiftably disposed upon the shutter shaft. The collar is adapted to slide in the direction of the longitudinal axis of the shaft but is held thereon against rotary motion. For this purpose there is provided upon the shutter shaft a key 32, fitting a keyway in the said collar. Into the groove of the collar reaches a pin 33 upon a crank 34 that is attached to a rocking shaft 35, the latter being oscillatably mounted in the camera casing, and provided with a handle 36 which is disposed outside of the said casing. For the purpose of holding the rocking shaft 35 in place against accidental movement, any suitable means may be made use of, for instance, there may be attached to or formed upon the said shaft a stop 37, against which and against the camera casing bears a spring 38, coiled upon the said rocking shaft.

Rotation may be imparted to the shutter shaft from a driving shaft, that is connected with the film feeding mechanism. This shaft is indicated in the drawings by the numeral 39, and provided with a handle 40 outside of the camera casing. To the driving shaft 39 is keyed or otherwise attached a gear 41, in mesh with a pinion 42, which is rigidly secured to a counter-shaft 43. This counter-shaft carries a bevel-gear 44, meshing with a similar gear 45 upon the shutter shaft.

The operation of this device is as follows: When the parts are in the positions shown in Figs. 1 to 4, inclusive, the shutter opening is unobstructed. If it is intended to decrease the size of the opening, the handle 36 of the rocking shaft is shifted so as to cause the grooved collar 31 to move upon the shutter shaft forward. By this operation the slide 23 is caused to move in a radial direction toward the center of the shutter disk, thereby shifting the leaves 21 and 22 around the shutter shaft toward closing positions. In this manner, obviously, any desired shutter opening may be obtained, ranging from a maximum to zero. Attention is called to the fact that the adjustment of the shutter opening may be effected during the operation of the camera, inasmuch as the shifting of the leaves of the shutter does not interfere with the operation of the film feeding mechanism. With the handle 36 there may be associated a graduated scale (not shown in the drawings) for the purpose of allowing the operator to predetermine the size of the shutter opening.

If it is intended to cause the pictures on the film band to be taken to fade away gradually, the handle 36 of the rocking shaft is moved slowly so as to shift the shutter leaves from their open to their closing positions. On the other hand if the pictures to be taken are to appear on the film band gradually, the shutter leaves are shifted slowly from their closing to their entirely open position. Obviously these operations may be also performed during the running of the camera.

A modification of the invention is illustrated in Figs. 5 to 7, inclusive, differing from the one above described in that, instead of the links 26 and 27, there are rigidly secured to the lug 24 two racks 46 and 47, which mesh with pinions 48 and 49, that are secured to the shutter leaves 21 and 22, respectively. If, in this case, the grooved collar 31 is shifted upon the shutter shaft, the said racks are caused to move down or up, according to the motion of the grooved collar, and accordingly the shutter leaves are shifted to their closing or opening positions. Otherwise the operation of the mechanism is the same as that of the device above disclosed.

What we claim is:—

1. A shutter for cinematographic cameras, comprising a rotary shaft, a disk fixedly attached thereto having an opening, two leaves oscillatably mounted upon said shaft for controlling said opening, a member shiftably disposed upon said shaft, and a connection between said member and said leaves for actuating the latter upon shifting said member.

2. The combination with a camera casing, of a shutter shaft rotatably mounted therein, a disk fixedly attached to said shaft having an opening, two leaves oscillatably mounted upon said shaft for controlling said opening, a member shiftably disposed upon said shaft, a connection between said member and said leaves for actuating the latter upon shifting said member, and operating means extending through said casing and in engagement with said member for manually operating said member.

3. A shutter for cinematographic cameras, comprising a rotary shaft, a disk fixedly attached thereto having an opening, two leaves oscillatably mounted upon said shaft for controlling said opening, a member shiftably disposed upon said shaft, a slide movable in a radial direction on said disk, a link connecting said slide with each leaf, and a link connecting said slide with said shiftable member, whereby said leaves are actuated upon shifting said member.

4. A shutter for cinematographic cameras, comprising a rotary shaft, a disk fixedly attached thereto having an opening, two leaves oscillatably mounted upon said shaft for controlling said opening, and means upon said shaft in engagement with said leaves for actuating the latter.

5. A shutter for cinematographic cameras, comprising a rotary shaft, a disk fixedly attached thereto having an opening, two leaves oscillatably mounted upon said shaft for controlling said opening, and means shiftably disposed upon said shaft in engagement with said leaves for actuating the latter.

Signed at New York, in the county of New York and State of New York, this 31st day of May, A. D. 1916.

AUGUST CHRONIK.
LOUIS CHRONIK.